United States Patent [19]

Berry et al.

[11] Patent Number: 5,375,235
[45] Date of Patent: Dec. 20, 1994

[54] METHOD OF INDEXING KEYWORDS FOR SEARCHING IN A DATABASE RECORDED ON AN INFORMATION RECORDING MEDIUM

[75] Inventors: Victor A. Berry; Arsene Hanssens, both of Milford; Evan B. Ross, Waltham; Aaron G. Daisley-Harrison, Framingham, all of Mass.

[73] Assignee: Northern Telecom Limited, Montreal, Canada

[21] Appl. No.: 788,081

[22] Filed: Nov. 5, 1991

[51] Int. Cl.⁵ ............................................. G06F 15/40
[52] U.S. Cl. ............................. 395/600; 364/DIG. 1; 364/282.1; 364/283.1; 364/253; 364/253.1
[58] Field of Search .................. 395/600, 650, 700

[56] References Cited

U.S. PATENT DOCUMENTS

| | | |
|---|---|---|
| 3,670,310 | 6/1972 | Bharwani et al. |
| 4,276,597 | 6/1981 | Dissly et al. ........... 364/300 |
| 4,358,824 | 11/1982 | Glickman et al. ........ 395/600 |
| 4,429,385 | 1/1984 | Cichelli et al. ......... 395/600 |
| 4,554,631 | 11/1985 | Reddington ............. 395/600 |
| 4,817,036 | 3/1989 | Millett et al. ......... 395/600 |
| 4,972,349 | 11/1990 | Kleinberger ............ 395/600 |
| 5,062,074 | 10/1991 | Kleinberger ............ 395/600 |
| 5,168,565 | 12/1992 | Morita ................. 395/600 |

OTHER PUBLICATIONS

Patent Abstracts of Japan, Publication No. JP 57-166668; Publication Date Oct. 1982; Abstract Publication Date Jan. 1983; Abstract vol. 007010.

*Primary Examiner*—Kevin A. Kriess
*Attorney, Agent, or Firm*—Foley & Lardner

[57] ABSTRACT

A method of storing and searching data on a mass storage medium is provided. A dictionary of keywords in a data file is compiled and a unique ID number is assigned to each keyword. A plurality of the most frequently occurring keywords are assigned ID numbers opposite in sense to the frequency of occurrence of the keyword. The dictionary of keywords is classified into a plurality of classes, the class of keywords least frequently occurring within the database having the fewest levels of indexing and the most amount of information regarding the exact location of a keyword within the data file.

13 Claims, 3 Drawing Sheets

KEYWORD INDEX BLOCK

| ID# | TYPE | KEYWORD | Pointer to occurrence table or occurrence if Type = 1 |
|---|---|---|---|
| 1252<br>213<br>6228<br>477721 | 1<br>4<br>3<br>2 | append<br>apple<br>asymmetry<br>axe | Page 653 word 12021<br>no occurrence information<br>row 7 occurrence table<br>row 2 occurrence table |
| 1999<br>5670<br>69021<br>4321 | 3<br>4<br>1<br>3 | batmobile<br>bust | row 4 occurrence table<br>no occurrence information<br>Page 7, word 1500<br>row 22 occurrence table |
| | | | |

12b

OCCURRENCE TABLE 14

| 1 | |
|---|---|
| 2 | page 3 word 503, 5 word 932 |
| 3 | |
| 4 | page block 1,2,3,12,15,16,22. |
| 5 | |
| 6 | |
| 7 | pages 2,3,21,35,36,38,92,135, |

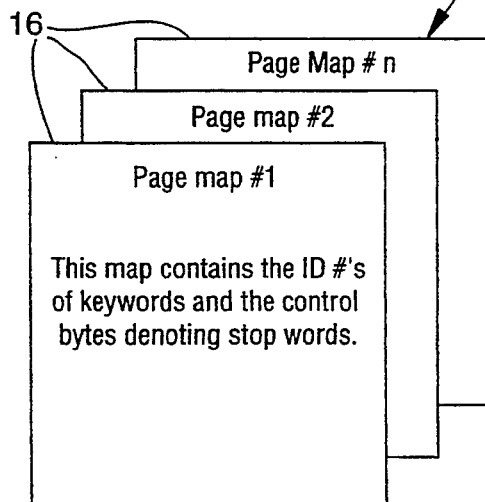

Page Map # n

Page map #2

Page map #1

This map contains the ID #'s of keywords and the control bytes denoting stop words.

FIG.3

METHOD OF INDEXING KEYWORDS FOR SEARCHING IN A DATABASE RECORDED ON AN INFORMATION RECORDING MEDIUM

FIELD OF THE INVENTION

The invention relates to a method of indexing and retrieving data stored within a large database.

BACKGROUND OF THE INVENTION

The physical size of many databases containing technical documentation such as graphics and text is becoming increasingly unwieldy to contain on printed pages. Technical descriptions of many electronic systems for example may include a multitude of binders of printed information. Aside from the physical size of bound printed pages, it is difficult to search for terms or phrases contained within a binder's printed pages. As of late, it has been found to be more practical to contain databases on an electronic storage medium rather than on paper. Typically, readers coupled to video display terminals provide access to the information contained within electronic storage devices.

One common type of storage device currently used for the storage of bulk media such as text is the compact disc read only memory (CD-ROM). Other forms of electronic storage media include hard disk drives, magnetic tape drives and floppy disk drives. CD-ROM discs are often the chosen form of data storage medium as they are convenient, holding hundreds of megabytes of information on a nearly indestructible inexpensive disc. Unfortunately, the speed at which information may be retrieved from a CD-ROM disc using standard off-the-shelf drives is a major limitation; typically, they are much slower than hard drives. On the average, a unit of information can be retrieved from a CD-ROM disc in approximately 1.5 seconds and sequential read operations to retrieve contiguous sequentially stored information takes approximately 0.1 seconds. If information is to be retrieved and the location of the information on the disc is unknown, the entire disc may have to be searched. Searching all of a 650 megabytes CD-ROM disc typically takes longer than 60 minutes.

Schemes are known which attempt to lessen the time to retrieve information from a CD-ROM and other large storage media. Such schemes often provide alphabetized indexes of keywords within a document in the form of a dictionary; pointers are provided to locations in a document where keywords may be found. Some schemes for searching data within a database are specific to the type of data that will be searched. For example, patent databases often have indexing schemes that relate to particular fields within a database. These fields may include assignee, patentee, inventor, and others. Organizing data in such a manner may produce favourable and timely search results, however, the searching index is application specific and information about the type of data being searched must be known ahead of time. It would be preferable to have a more generic method of organizing data wherein the index fields could be used on any textual database data being stored. One scheme for information storage and retrieval is exemplified in U.S. Pat. No. 4,276,597 in the name of Dissly et al. Dissly describes a method and apparatus for identifying particular desired information bearing records having desired predetermined indentifiable characteristics from a set of such records in a base data file. A special retrieval file including arrays of binary coded elements is produced and maintained from the information content of the base data file. While some schemes are better than others, some best suited to particular media, most indexing schemes are costly in overhead. The dictionary of keywords and indexing tables often take up as much or more storage space on the CD-ROM as the document itself. Having a large dictionary and database index also tends to slow the search process as the dictionary and database also have to be scanned. Therefore, the index must be kept as small as possible, and related information should be kept as close together as possible.

It is an object of the invention to improve the time requirement to access data from a data storage medium.

It is another object to provide an improved indexing scheme for the data stored on a data storage medium.

SUMMARY OF THE INVENTION

The invention provides a mechanism for searching keywords in a database stored on a recording medium. The keywords are classified according to their frequency of occurrence within the database, the classification corresponding to a particular form of indexing, the indexing provided by lookup tables is stored on the recording medium.

In accordance with the invention there is provided, a method of indexing keywords for searching in a database recorded on an information recording medium comprising the steps of: parsing the database; assigning a unique ID number to each unique keyword, wherein at least a plurality of the most frequently used keywords are assigned the numerically lowest ID numbers; storing each keyword in alphabetical order on the recording medium including the corresponding assigned ID number providing at least one level of indexing between the keywords and the database; storing a table on the recording medium, the table mapping each ID number to a corresponding keyword within the database and, storing the database on a portion of the recording medium.

The invention further provides a method of indexing keywords comprising the step of assigning one of a plurality of class tags to each keyword, each class based on the frequency of occurrence of the keyword within the database, each class having associated with it a different level of indexing for searching a keyword, the class of keywords least frequently occurring in a database having the fewest levels of indexing.

In another aspect of the invention there is provided a database and search index comprising: at least one data file, a dictionary of keywords, the dictionary including a list of keywords in the file, each keyword having an associated ID number, a plurality of the most frequently occurring keywords having ID numbers opposite in sense to the frequency of occurrence of the keyword; and a plurality of pagemaps, each pagemap comprising ID numbers, wherein the positions of the ID numbers within a pagemap corresponds positionally to keywords within the data file.

DESCRIPTION OF THE DRAWINGS

An embodiment of the invention will be described in conjunction with the drawings in which:

FIG. 3 is a diagram of indexing tables depicting the interrelationship of the data structures shown in FIGS. 1 and 2.

With reference to FIG. 1, a CD-ROM disc 10 is shown partitioned into data structures. A data structure may be in the form of one or more tables, indexes, or the data base which is intended to be stored and viewed. Data structures are stored on the CD-ROM disc 10 and are coded in a binary form. A search engine (not shown) in the form of a suitably programmed microprocessor executing a viewer software program is coupled to an off-the-shelf CD-ROM disc drive (not shown) and is capable of accessing and decoding the information stored on the disc 10. In general it is desirable to provide related information that will be read or scanned, as a block of contiguous data or positionally proximal data.

A dictionary 12 shown as the outer partition adjacent the periphery of the disc 10 may comprise millions of bytes of information. The dictionary 12 need not necessarily be situated on the periphery; however, in order to have the slow moving head of the CD-ROM disc drive move as short a distance as possible over the surface of the disc 10 when reading information, it is advantageous to have related information as close together as possible.

THE DICTIONARY

Figures 1, 2:
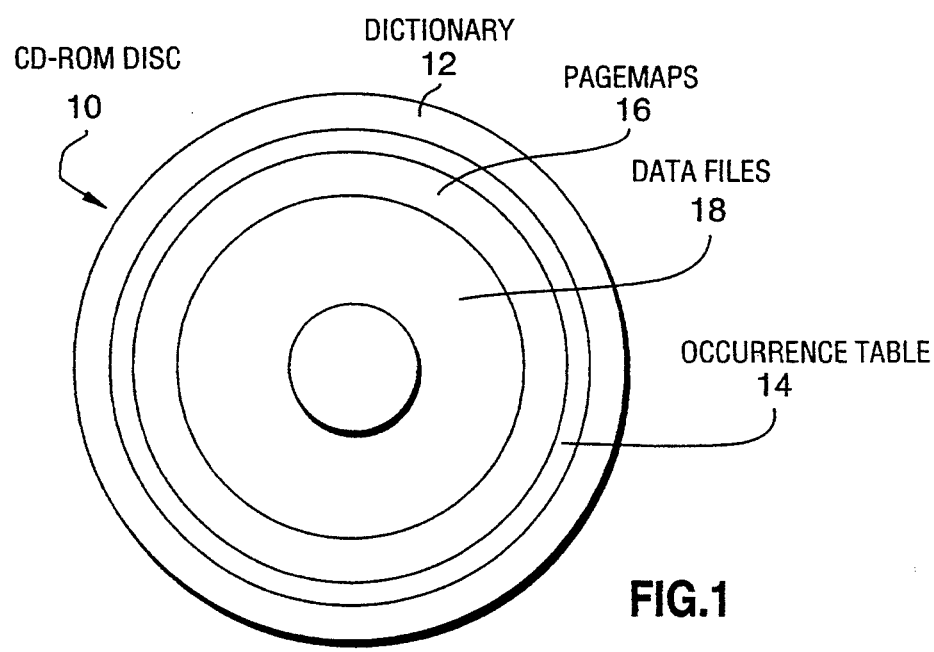
FIG. 1 is a diagram of a CD-ROM disc partitioned into data structures in accordance with the invention.
FIG. 2 is a table showing one of the data structures of FIG. 1.
Figure 4:
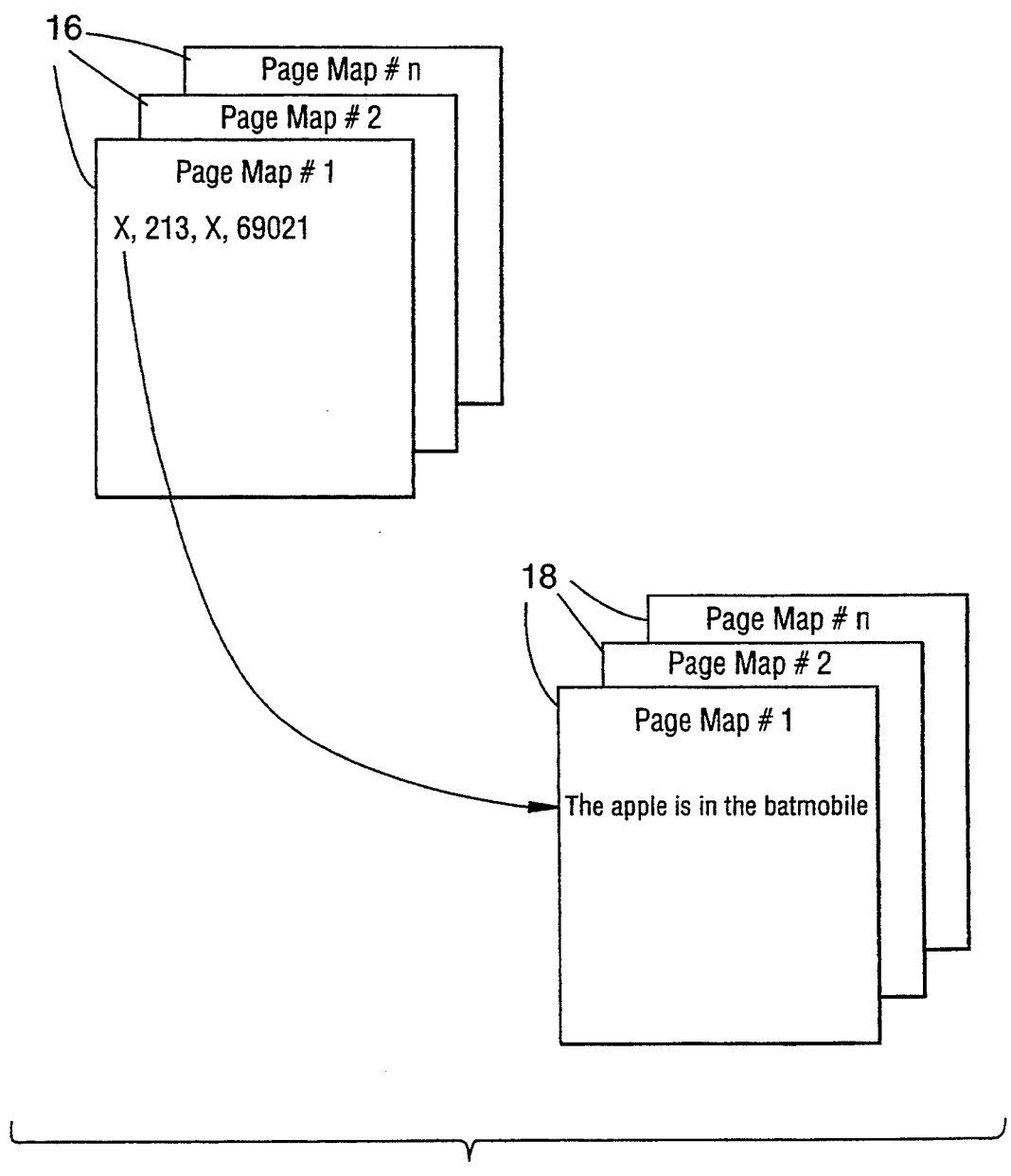
FIG. 4 is a diagram of pagemaps and page tables in accordance with the invention.

In accordance with the invention, when a CD-ROM disc is mastered, a large percentage of the disc is dedicated to store a database of documents comprised of a plurality of pages within files in a printable or viewable form. However, a portion of the CD-ROM disc is further apportioned to other data structures in the form of indexes and tables used for managing and searching the database documents stored on the disc. These data structures related to management and searching are transparent to the user of the database. When a user wants to retrieve a word or phrase on a CD-ROM disc a search statement is entered and the word appears on the terminal if it is in the document. The user need not have any knowledge or understanding of the dictionary 12, occurrence table 14, or pagemaps 16. These data structures which will be described in detail provide a mechanism for the speedy retrieval of data. The tables shown in FIGS. 2, 3, and 4 are representations of tables in binary form that are stored on the CD-ROM disc 10. The binary tables are not in a form for the user to read. These representations of binary tables as shown in FIGS. 2 and 3 are shown to allow a person skilled in the art to understand the data structures and mechanisms that are in place.

Prior to mastering the CD-ROM disc 10 the database documents to be placed on the disc 10 are parsed and a dictionary 12 of all the unique words is compiled. Each unique word is assigned a unique ID number and each ID number is preceeded by a control byte. The function of the control byte is twofold; a 5-bit field identifies the type of word that follows and if the type is designated to be a stop word such as "the, and, if, but, and then", a 3-bit field of the 8-bit control byte specifies the number of stop words that successively follows the control byte. Later in the process of mastering, pagemaps 16 are built corresponding to direct mappings of pages within the database documents. Stop words are replaced with the control byte denoted in FIG. 4 with an "X" thereby indicating their occurrence. The pagemap 16 is a positional mapping of keywords on a page in a compressed form.

The dictionary 12, which is a two level structure, may have hundreds of thousands of unique words in it; thus in order to perform a general search before specifically searching for a word, a first level search is done. With reference to FIGS. 2 and 3, the first level corresponds to a primary keyword index 12a; a second level corresponds to a plurality of keyword index blocks 12b. Segmenting the dictionary 12 into a two level structure minimizes the number of words that must be scanned within the dictionary 12. Locating an initial string of a word in the primary keyword index 12a indicates generally where a word may be found. By comparing a search term with all the keys in the primary keyword index 12a, the keyword index block 12b that the word will be found in will be located, if the word exists at all. The primary keyword index 12a is a table comprised of keys or starting blocks of alphabetized words; each starting block is a pointer to the keyword index block 12b. For example, the keywords "append, apple, asymmetry, and axe" are all represented by the text string "appe" and have a number corresponding to their row in the primary keyword index, such as "1" indicating row 1. The next block of alphabetically sequential words is "axiom, axis batmobile and bust", the second row of the primary keyword index 12a will have the least ambiguous form of the word denoted by the string "axio" with the number 2 in the row field. A search for any of the words axiom, axis, batmobile, and bust is limited to block 2 of the keyword index block as shown in FIG. 2. The number of entries of a block in the keyword index block 12b may be varied and the given example is merely illustrative. The primary keyword index should be kept as small as possible and should remain in a fast memory (not shown) coupled to the search engine, most, if not all of the time in order to facilitate quickly locating a keyword index block.

The keyword index blocks 12b pointed to by the primary keyword index 12a are mastered on portions of the CD-ROM disc 10 within the dictionary 12. These blocks contain specific information about a text string being searched. For example, if it was determined by performing a binary general search on the primary keyword index 12a that the word being searched was in block 2, eliminating other blocks alphabetically out of range, block 2 of the keyword index blocks would be scanned and the keyword being searched, for example "batmobile" would be located. Other fields of information stored in block 2 are generally used to locate the word "batmobile" within the document. Information stored within a block of the keyword index blocks 12b is in the form: full word, the ID number, the type of word, and occurrence information or occurrence table 14 information. Word type, and occurrence information will be described later.

The keyword index blocks 12b are arranged in alphabetical order and keyword ID numbers are assigned to words or text strings on an ad hoc basis. However, one exception to this is that the 256 statistically most frequently used words are given ID numbers that vary between 0 and 255 depending upon their frequency of appearance. The most frequently used word would be assigned the lowest ID number 0. The next most frequently used word would be assigned the ID number 1, and so on, up to ID number 255. Thus, these 256 ID numbers from 0 to 255 are inversely weighted and opposite in sense, according to their frequency of occurrence within a database. The purpose for tagging the most frequently used words with numbers between 0 and 255 allows each occurrence of them to be identified within a byte data storage on a pagemap 16. After all the ID numbers from 0 to 255 have been assigned, the keyword index block 12b is alphabetized and all remaining keywords in the document which have not been assigned ID numbers are mapped to a unique identification (ID) number having values of 256 and upward. The term document may refer to a single large file or many hundreds of smaller files, a file typically having many pages.

OCCURRENCE TABLE

The occurrence table 14 is an index stored on a portion of the CD-ROM disc 10 containing fields including page numbers and locations of keywords on pagemaps 16. A pagemap 16 is a representation, in human readable form, of a page of a document. Text strings in the form of keywords do not appear on pagemaps 16; keywords are replaced with their respective ID numbers. Human readable form refers to the order in which words are read and does not refer to the pagemap 16 as being readable or discernable by humans.

The dictionary 12 maps unique strings or keywords to unique ID numbers. However, ID numbers must be mapped to their position or positions within a document in order to locate the keyword within a document. This mapping is done in most instances via the occurrence table 14 and the pagemaps 16. When a search word or string of search words is located on a particular pagemap 16, the search engine executing viewer software uses the current page and absolute word location within the document to display the page on a display terminal.

WORD TYPES

Keywords which are single instance words, occurring only once within a database or document of data files 18, are referred to as type 1 keywords. Since type 1 keywords occur only once, little information is required to completely describe the location of these keywords within the document. For example, a type 1 word is located only once on a particular page at a particular location. A type 4 word on the other hand occurs on multiple pages in multiple locations. Therefore type 1 words will have occurrence information specified in the keyword index block 12b and the occurrence table 14 will not be used to search these keywords; hence these type 1 words will be located more quickly as there are fewer levels of indexing required. A type 2 word is one that occurs on less than 10% of the pages within a database, a type 3 word occurs on less than 25% of the pages and a type 4 words occur on more than 25% of the pages. Since type 2 and type 3 words have multiple occurrences and hence multiple locations, more space is required to describe these classes of words. Because the number of occurrences of a type 3 word is greater than the number of occurrences of a type 2 word, the occurrence table 14 specifies only the page block of the pagemaps 16 where the type 3 word is located. A page block may represent as many as 16 pages. Both the page numbers and a word's position are specified in the occurrence table 14 for type 2 words. Type 4 words have so many occurrences within a document that the search engine must scan the pagemaps 16 directly; the likelihood of finding a type 4 word on any given page would be greater than 25%. The percentages assigned to type 2, 3 and 4 words are merely exemplary and may be varied. Other benefits are evident from using types or classes of words. For example if a searcher wants to search the phrase "My apple is in the batmobile", the phrase appearing on a pagemap would be in the form "X, 213, X, 69021", ("X" being a control byte and denoting a stop word). If the apple, a type 4 word was to be searched for first, each page of the pagemaps table would have to be scanned until apple was found. Therefore, when a phrase is searched, a type x word is searched before a type y word, where x<y. In the above example batmobile would be located first as it is a type 1 word and type 1 words, in general, can be located much more quickly than type 4 words. After batmobile is located on a particular pagemap, the pagemap is scanned to determine if the search string 213, X, 69021 is on the page. In the instance that the search string is not found, other pagemaps where batmobile is located are scanned for the search string until it is found.

In summary, assigning a class or type to keywords on the basis of the number of occurrences of the word within a database and having one or more levels of indexing related to each class provides a mechanism for searching which is relatively fast and requires less storage space than most conventional indexes.

We claim:

1. A method of indexing a plurality of keywords for searching in a database recorded on an information recording medium, the method comprising the steps of:
   providing a plurality of information pages in the database for searching by the keywords and for display or printing in readable form;
   providing a dictionary of the keywords to be used in searching the information pages, each of the keywords having associated therewith a unique ID number, a keyword type dependent upon a frequency of occurrence of the keyword within the database and an occurrence pointer;
   providing an occurrence table for mapping the keywords of at least one keyword type to corresponding occurrence data; and
   providing a plurality of pagemaps, one for each corresponding information page in the database, for mapping keyword ID numbers to physical locations on the corresponding information page;
   whereby the location of a particular keyword within the information pages is determined by one of the occurrence pointers, the occurrence table and pagemaps.

2. A method as claimed in claim 1, wherein the dictionary includes first and second levels, the first level having truncated keywords each having a corresponding block indicator, the second level having for each block indicator a group of keywords corresponding thereto.

3. A method as claimed in claim 2, wherein the groups of keywords are ranked in alphabetical order.

4. A method as claimed in claim 1, wherein a first keyword type corresponds to a first set of the keywords whose frequency of occurrence is lowest, the occurrence pointer for each of the keywords the first keyword type comprising a pagemap location including a pagemap number and a word number.

5. A method as claimed in claim 4, wherein a second keyword type corresponds to a second set of the keywords whose frequency of occurrence is second lowest, the occurrence pointer for the keywords of the second keyword type comprising a row in the occurrence table.

6. A method as claimed in claim 5, wherein a third keyword type corresponds to a third set of the keywords whose frequency of occurrence is highest, the occurrence pointer for each of the keywords of the third keyword type comprising no occurrence information, whereby the plurality of pagemaps are searched sequentially to locate a particular keyword of the third keyword type.

7. A method of indexing a plurality of keywords for searching in a database containing a plurality of information pages, a keyword dictionary, on occurrence table and a plurality of pagemaps corresponding to the plurality of information pages, the method comprising the steps of:

- storing the keywords in the dictionary;
- associating, in the dictionary, each of the keywords with a unique ID number, a keyword type dependent upon a frequency of occurrence of the keyword in the database and an occurrence pointer;
- mapping, in the occurrence table, the keywords of at least one keyword type to corresponding occurrence data; and
- mapping, in the pagemaps, keyword ID numbers to corresponding physical locations in the information pages;
- whereby the location in the database of a particular keyword is determined by one of an occurrence pointer associated with the particular keyword, an entry related to the particular keyword in the occurrence table and an entry related to the particular keyword in the pagemaps.

8. A method as claimed in claim 7, wherein the dictionary includes, for at least a subset of the keywords, first and second levels, the first level containing truncated keywords each corresponding to a block indicator and the second level containing a group of keywords corresponding to each block indicator.

9. A method as claimed in claim 8, wherein the groups of keywords are ranked in alphabetical order.

10. A method as claimed in claim 7, wherein a first keyword type corresponds to a first set of the keywords having a lowest frequency of occurrence, the occurrence pointer for each of the keywords of the first keyword type comprising a pagemap location including pagemap number and a word number.

11. A method as claimed in claim 10, wherein a second keyword type corresponds to a second set of the keywords having a second lowest frequency of occurrence, the occurrence pointer for each of the keywords of the second keyword type comprising a row in the occurrence table.

12. A method as claimed in claim 11, wherein a third keyword type corresponds to a third set of the keywords having a highest frequency of occurrence, the occurrence pointer for each of the keywords of the third keyword type comprising no occurrence information, whereby the plurality of pagemaps are searched sequentially to locate a particular keyword of the third keyword type.

13. A method as claimed in claim 11, wherein a keyword search for a string of keywords comprises a first search for keywords of the first keyword type, upon failure to locate the string of keywords in the first search, the keyword search proceeds to a second search, the second search being for keywords of the second keyword type, and upon failure to locate the string of keywords in the second search, the keyword search includes a third search to search for keywords of the third keyword type.

* * * * *